US009550605B1

(12) United States Patent
Summers

(10) Patent No.: US 9,550,605 B1
(45) Date of Patent: Jan. 24, 2017

(54) NESTING CONTAINER ASSEMBLY

(71) Applicant: Matthew A. Summers, Ridgeland, MS (US)

(72) Inventor: Matthew A. Summers, Ridgeland, MS (US)

( * ) Notice: Subject to any disclaimer, the term of this patent is extended or adjusted under 35 U.S.C. 154(b) by 0 days.

(21) Appl. No.: 14/838,947

(22) Filed: Aug. 28, 2015

Related U.S. Application Data

(60) Provisional application No. 62/043,588, filed on Aug. 29, 2014.

(51) Int. Cl.
*B65D 21/02* (2006.01)
*B65D 25/24* (2006.01)
*B65D 25/28* (2006.01)
*B65D 43/02* (2006.01)
*B62B 1/00* (2006.01)

(52) U.S. Cl.
CPC .......... *B65D 21/0215* (2013.01); *B62B 1/006* (2013.01); *B65D 25/24* (2013.01); *B65D 25/28* (2013.01); *B65D 43/02* (2013.01)

(58) Field of Classification Search
CPC ............ B65D 21/0215; B65D 21/0216; B65D 21/0201; B65D 21/0202; B65D 25/24; B65D 25/28; B65D 43/02; B62B 1/004; B62B 1/006
USPC ....................................... 280/33.991, 33.998
See application file for complete search history.

(56) References Cited

U.S. PATENT DOCUMENTS

| 3,419,184 A * | 12/1968 | Asenbauer | ......... B65D 21/0222 |
| | | | 206/508 |
| 3,987,829 A | 10/1976 | Leone | |
| 4,287,997 A | 9/1981 | Rolfe et al. | |
| 4,452,555 A | 6/1984 | Calabro | |
| 5,058,746 A | 10/1991 | Morgan, IV | |
| 5,085,448 A | 2/1992 | Shubin | |
| 5,186,330 A | 2/1993 | McClure | |
| D358,765 S | 5/1995 | Dickinson et al. | |
| 5,564,805 A | 10/1996 | Dickinson | |

(Continued)

OTHER PUBLICATIONS amazon.com | "Pelican 0550 Transport Case with Foam, Black," webpage as provided by Internet Archive Wayback Machine at <https://web.archive.org/web/20130703023132/http://www.amazon.com/Pelican-0550-Transport-Case-Black/dp/B0050F1O06?>, published on or before Jul. 3, 2013.

(Continued)

*Primary Examiner* — John Walters
(74) *Attorney, Agent, or Firm* — Hanrahan Law Firm, P.A.; Benjamin M. Hanrahan

(57) ABSTRACT

An interlocking or engaging container and container system are presented herein. In particular, the system includes a plurality of adjacently disposed (side-by-side, end-to-end and stacked) containers that are dimensioned to maximize the available space on a pallet, for example, a 463-L Pallet, HCU-6/E Pallet or other pallet. The containers include enlarged wheels, one or more support feet, and a handle assembly. The containers are configured to include a plurality of interlocking or engaging portions such as one or more wheel assembly receiving portions, one or more foot receiving portions, outer extensions or engaging portions, and a handle engaging portion. The Interlocking or engaging portions are configured to matingly engage or abut corresponding portions of an adjacent container and at least partially restrict movement there between.

19 Claims, 19 Drawing Sheets

(56) References Cited

U.S. PATENT DOCUMENTS

| | | | |
|---|---|---|---|
| 5,709,008 A | 1/1998 | Dickinson | |
| 5,785,328 A * | 7/1998 | Eckloff | B62B 3/16 206/821 |
| D401,412 S | 11/1998 | LeTrudet | |
| 6,116,390 A | 9/2000 | Cohen | |
| D467,424 S | 12/2002 | Hardigg et al. | |
| D467,425 S | 12/2002 | Hardigg et al. | |
| D467,426 S | 12/2002 | Hardigg et al. | |
| 6,983,946 B2 * | 1/2006 | Sullivan | B62B 1/002 206/511 |
| 7,011,214 B2 | 3/2006 | Brackmann et al. | |
| 7,044,528 B2 | 5/2006 | Rhodus | |
| 7,163,122 B2 | 1/2007 | Elder et al. | |
| 7,350,789 B2 | 4/2008 | Uffner et al. | |
| 7,482,928 B2 | 1/2009 | Brackmann et al. | |
| 7,530,580 B2 | 5/2009 | Holgesson | |
| 7,537,119 B2 | 5/2009 | Becklin | |
| 7,714,708 B2 | 5/2010 | Brackmann et al. | |
| 7,780,026 B1 * | 8/2010 | Zuckerman | B65D 21/0202 206/504 |
| 7,854,321 B2 | 12/2010 | Twig et al. | |
| 7,883,096 B2 | 2/2011 | Katz et al. | |
| 7,938,412 B2 | 5/2011 | Katz | |
| 8,132,819 B2 | 3/2012 | Landau et al. | |
| 8,146,771 B1 | 4/2012 | Segeleon | |
| 8,256,242 B1 * | 9/2012 | Evans | A45C 13/262 62/457.7 |
| 8,561,769 B2 * | 10/2013 | Andochick | A45C 5/14 190/108 |
| 8,567,796 B2 | 10/2013 | Bar-Erez et al. | |
| RE44,656 E | 12/2013 | Becklin | |
| 2004/0007574 A1 * | 1/2004 | Most | B65F 1/1468 220/23.4 |
| 2005/0036847 A1 | 2/2005 | Brackmann et al. | |
| 2005/0199459 A1 | 9/2005 | Harvey | |
| 2007/0130731 A1 | 6/2007 | Hakami | |
| 2009/0178946 A1 | 7/2009 | Patstone et al. | |
| 2012/0292867 A1 | 11/2012 | Allam et al. | |

OTHER PUBLICATIONS

Pelican | "Portable Warehouse," "New From Pelican 0550 Transport Case: The World's Largest Injection Molded Protector Case." <img.pelican.com/docs/products/protector/0550_Postcard.pdf>, printed on May 9, 2016; earliest publication date unknown.

* cited by examiner

NESTING CONTAINER ASSEMBLY

CLAIM OF PRIORITY/CROSS REFERENCE TO RELATED APPLICATION

The present application is based on and a claim to priority is made under 35 U.S.C. §119(e) to provisional patent application Ser. No. 62/043,588, having a filing date of Aug. 29, 2014, the contents of which are incorporated herein their entirety by reference.

FIELD OF THE INVENTION

The present invention is directed to an interlocking or other container with enlarged wheels which, in certain embodiments, is structured and sized to maximize available space in a pallet (e.g., 463-L Pallet, HCU-6/E Pallet, or other pallets), while reducing the time and work necessary for a user to load and unload the container, transport the container, and stack or load and unload the pallet.

BACKGROUND OF THE INVENTION

The transportation of goods, equipment, or materials is often conducted or facilitated by stacking or otherwise placing the items on a pallet for loading and subsequent unloading to and from transportation vehicles, including, for example, trucks, trains, planes, etc. In particular, and for exemplary purposes only, the United States military branches and/or organizations such as the U.S. Army, Navy, Air Force, Coast Guard, Federal Emergency Management Administration, and other Department of Defense organizations, as well as those operated or existing in foreign or non-U.S. countries, oftentimes use a standard size pallet such as a 463-L Pallet and/or HCU-6/E Pallet, although others may be used.

A number of inefficiencies and problems exist in the currently used manner of transporting traditional containers to and from the pallets, and loading, stacking or unloading materials or items on or from the pallets for shipment. For example, in the military environment, military personnel are often tasked with loading containers or boxes with equipment, clothing, materials, etc. and bringing those containers or boxes to the pallet for loading onto the pallet. The containers or boxes are oftentimes extremely heavy, bulky and difficult to transport, especially over unfinished surfaces (such as gravel, sand, grass, etc.) commonly present in the military environments.

Moreover, the containers or boxes, which are generally of a non-uniform shape and size, are then loaded onto the pallet—a time-consuming and extremely labor intensive task. For example, loading the traditional containers or boxes onto the pallet may require guesswork and/or trial-and-error in order to position or orient the traditional containers to fit on the pallet in an optimum manner, position or orientation. Once loaded, the non-uniform shape and size of the containers or boxes create an excessive amount of wasted space between the items or containers. Finally, a packed pallet can oftentimes be unsteady and can collapse before, during or after shipment creating a dangerous situation and environment for crew and passengers of the vessel, ship or other vehicle used to transport the pallet.

Accordingly, there is a need for a stacking and/or interlocking container for use in connection with the transportation of equipment, materials, items, etc. via a pallet, including, but not limited to the 463-L Pallet. The proposed container(s) may include enlarged wheels and a handle assembly for easy transportation along unfinished or uneven surfaces (e.g., gravel, sand, grass, etc.) and can be sized to fit neatly on the pallet with minimal or no wasted space in between. The proposed containers may be easily and intuitively stacked via interlocking and/or abutting portions therein and are configured such that a person need not guess as to which direction or orientation the containers can be stacked or interlocked with one another. For instance, it is visually clear that the wheels of one container fit within corresponding wheel receiving portions of another container.

Further, certain embodiments of the proposed containers of the present invention may include interlocking members, such as positive and negative shapes, cast onto the outer surfaces thereof, allowing adjacent or stacked containers to be interlocked with one another. The interlocking and/or abutting capabilities restricts or prevents movement, shifting and ultimate collapse of the containers, for example, before, during or after transportation of the pallet.

SUMMARY OF THE INVENTION

The present invention is generally directed to a container that may engage, abut, interlock, or otherwise connect or nest with other like adjacent, adjoining or bordering containers positioned and stacked above, below, beside and end-to-end to one another. The containers of certain embodiments of the present invention are dimensioned in order to maximize the usable space of a pallet, including, but not limited to a 463-L Pallet, HCU-6/E Pallet, or other pallets, when used in concert with other like containers. To secure the containers on a pallet or otherwise in a connected, adjoining relation to one another, the user may push or position the containers into adjacent like containers, either front-to-back, side-to-side, or on top of one another. The nesting and cooperative configuration of the containers are also structured to restrict or prevent lateral and horizontal slipping or movement between the containers, for example, during transport.

For example, the containers of the various embodiments of the present invention include one or more interlocking, mating, or engaging portions that are cooperatively structured to receive, engage or mate with corresponding portions of an adjacently disposed, adjoining or bordering container, whether end-to-end, side-to-side or stacked. Particularly, one of the interlocking, mating or engaging portions may include a wheel assembly receiving portion disposed on an upper area of the container (e.g., at least partially on a lid) and configured to matingly receive the wheel assembly of an adjacent or adjoining container disposed in a stacked manner. Similarly, one of the interlocking, mating or engaging portions may include a foot receiving portion disposed on an upper area of the container and configured to matingly receive one or more feet of a stacked container.

Other interlocking, mating or engaging portions may include outer extension portions extending outward from the sides or ends of the container which laterally mate with corresponding extension portions from an adjacent or adjoining container disposed in a side-by-side or end-to-end manner. The outwardly protruding extension portions are correspondingly positioned on the sides and/or ends of the container(s) such that they line up laterally or next to the corresponding protrusions of an adjacent or adjoining container.

Yet another interlocking, mating or engaging portion of at least one embodiment may include a handle engaging portion that is structured and configured to receive and at last partially engage or retain a handle from an adjacent or adjoining container. The handle engage portion may thus slidingly receive the handle from an adjacent or adjoining container therein and thereby restrict movement between the containers in at least one direction.

In order to move a single container, the user may grab a handle assembly and lift the container slightly at the front (to disengage the foot, and engage the wheels). Using the mechanical leverage of the handle assembly and the wheels, the user is able to push, pull or otherwise move the container in the desired direction.

Additional features may include single or double walled reinforced construction providing superior strength and integrity to the container. For example, in at least one embodiment, the container may include an upper lip or edge upon which the lid rests or engages. The upper lip or edge may be constructed with a reinforced double walled configuration providing added strength and integrity and allowing the container to withstand heavy stacked loads. The lip may be supported, for example, vertically, by at least one wall, whether single or double walled. The at least one wall may include a corrugated, honeycomb or other like configuration having a plurality of alternating recesses and protrusions that provide additional strength and integrity to the container, as a whole.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
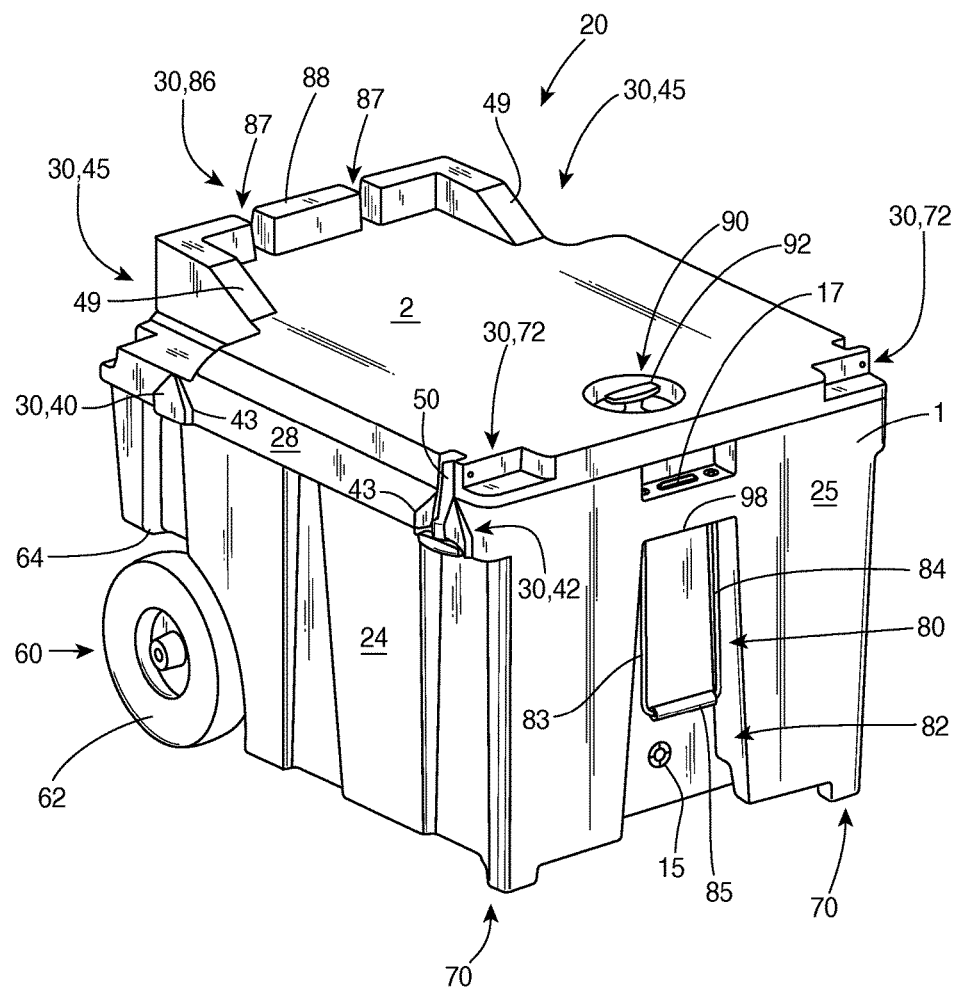
FIG. 1 is a front-left perspective view of a container disclosed in accordance with at least one embodiment of the present invention.
Figure 15:
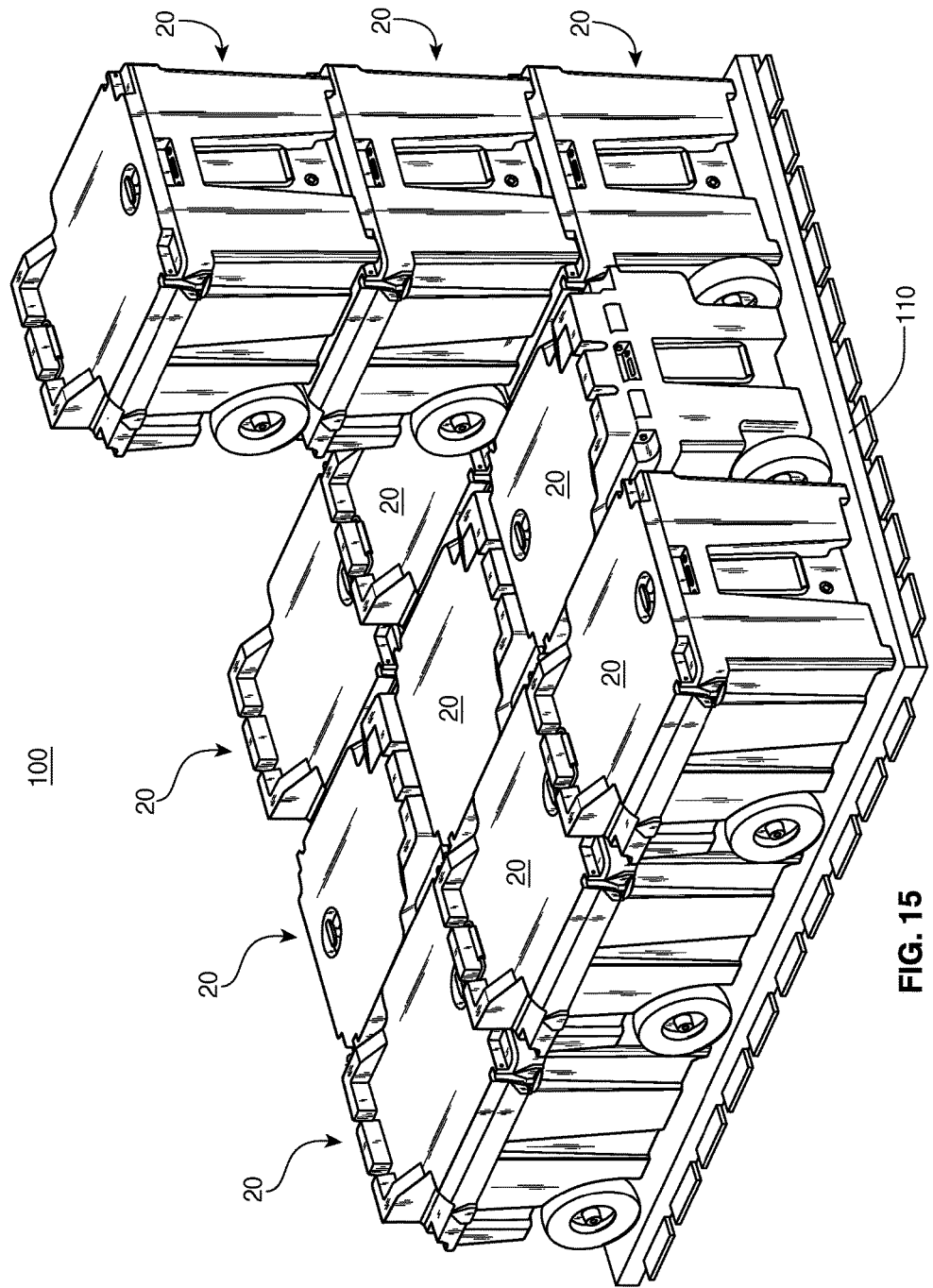
FIG. 15 is a perspective view of the container system or assembly comprising a plurality of adjacent containers disposed on a pallet, as disclosed in accordance with at least one embodiment of the present invention.

As shown in the accompanying drawings, and with particular reference to FIGS. 1 and 15, for example, the present invention is directed to a container 20 and container system or assembly 100 for facilitating the transportation or shipment of goods, materials, equipment, and other items. As described herein, certain embodiments of the container(s) 20 may, but need not be used in connection with standard pallet sizes, including, but not limited to a 463-L Pallet, HCU-6/E Pallet, etc. For example, in at least one embodiment, the dimensions of the container 20 may be formed or constructed so that when it is interlocked with, connected to or placed side-by-side, end-to-end, and/or stacked with additional adjacent or adjoining containers 20 of a similar construction and configuration in order to form a container system or assembly 100, the container system or assembly 100 of at least one embodiment will fit on the pallet 110, and in certain embodiments may use or occupy substantially all of the space provided on the pallet (e.g., 463-L or HCU-6/E pallet). As an example, the containers 20 may be placed side-by-side (e.g., three wide), front-to-back or end-to-end (e.g., three deep) and stacked top to bottom (e.g., four tall) to create a cube, cuboid or system of containers 20 that may be easily and efficiently placed onto the pallet for transportation.

It should also be noted that the container(s) 20 of the various embodiments described herein need not be used in connection with military or other pallets, and can instead be used individually or in conjunction with other similarly constructed and configured containers 20. Some embodiments of the containers 20 may function as a cooler, insulated box, portable ice chest or other like container that can be used to maintain a generally consistent temperature (e.g., cool or warm) therein.

In any event, the container 20 of at least one embodiment includes a box or base 1 defining an interior portion 5 (see, e.g., FIG. 14) and an at least partially open top portion. A lid 2 may be included and disposable in an at least partially covering and removable relation to the base 1. Specifically, the base 1 may be structured to include a bottom wall or bottom portion 22, a plurality of at least two oppositely disposed side walls 23, 24, an at least two oppositely disposed end walls, such as a front wall 25 and a rear wall 26. As described herein, the base 1 of at least one embodiment of the present invention is structured and configured to define an open portion (e.g., at the top) and an interior portion 5 for receiving and retaining items therein.

Furthermore, in at least one embodiment, the base 1 includes a rotationally molded plastic box measuring between approximately 27 and 29 inches wide, approximately 22 to 23 inches tall, and approximately 34 to 35 inches long, although other dimensions and materials may be contemplated and included within the full spirit and scope of the various embodiments of the present invention. In addition, the lid 2, of at least one exemplary embodiment may be rotationally molded from plastic and may measure approximately 34 and 35 inches long, between approximately 4 and 6 inches tall, and approximately 27 inches wide at its longest/widest points. Of course, other dimensions and materials for the lid 2 may be contemplated and included within the full spirit and scope of the various embodiments of the present invention.

In some embodiments, a cavity, lid retention portion, or ridge may extend around an upper surface 3 of the base 1, for example, at least partially around the open portion 5 which facilitates a tight and secure connection between the base 1 and the lid 2. Furthermore, in at least one embodiment, a silicone or other like gasket (not shown) may be disposed at least partially around the upper surface 3 of the base 1 for engagement or contact with the lid 2. In this manner, the lid 2 may be pivotally mounted to the box or base 1 and pivoted into an open and/or closed relation. Other connections, such as sliding engagement may be contemplated. In further embodiments, the lid 2 may be completely removed from the box or base 1.

Furthermore, as shown in the drawings and described herein, the base 1 of at least one embodiment of the present invention includes at least one, but in many cases, a plurality of interlocking, receiving, engaging and/or movement restriction portions, generally referenced as 30. As will be described herein, the plurality of interlocking, mating or engaging portions 30 of the present invention are structured to receive, engage, mate or nest with corresponding portions of a juxtaposed, adjacent or adjoining (e.g., laterally or side-to-side, end-to-end, or stacked) container 20' of a similar or identical construction or configuration such that the two containers 20, 20' cooperatively nest with one another. For instance, in at least one embodiment, the interlocking, mating or engaging portions 30 may include one or more recesses that receive corresponding portions (e.g., one or more wheels, one or more feet, one or more handles) from an adjacent or adjoining container 20' or one or more protrusions or positive members that cooperatively engage, mate or abut with corresponding portions (e.g., corresponding protrusions) from an adjacent or adjoining container 20'. In this manner, the positive and/or negative interlocking, mating or engaging portions 30 of the various embodiments of the present invention may engage, mate or interlock with one another in order to at least partially restrict movement between the container 20 and the adjacent or adjoining container 20' in at least one direction (e.g., forward and backward, side to side, twisting, etc.)

Figure 9:
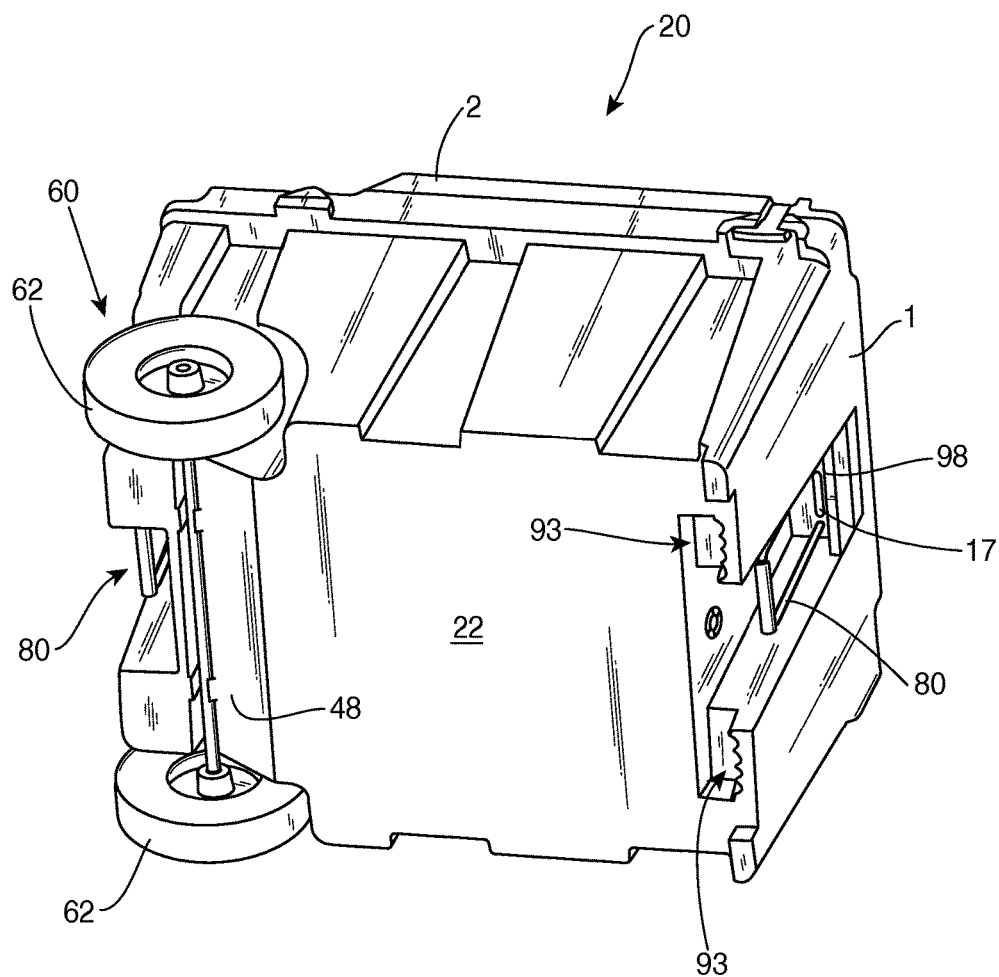
FIG. 9 is a bottom perspective view of the container illustrated in FIGS. 1 thorough 8.
Figure 10:
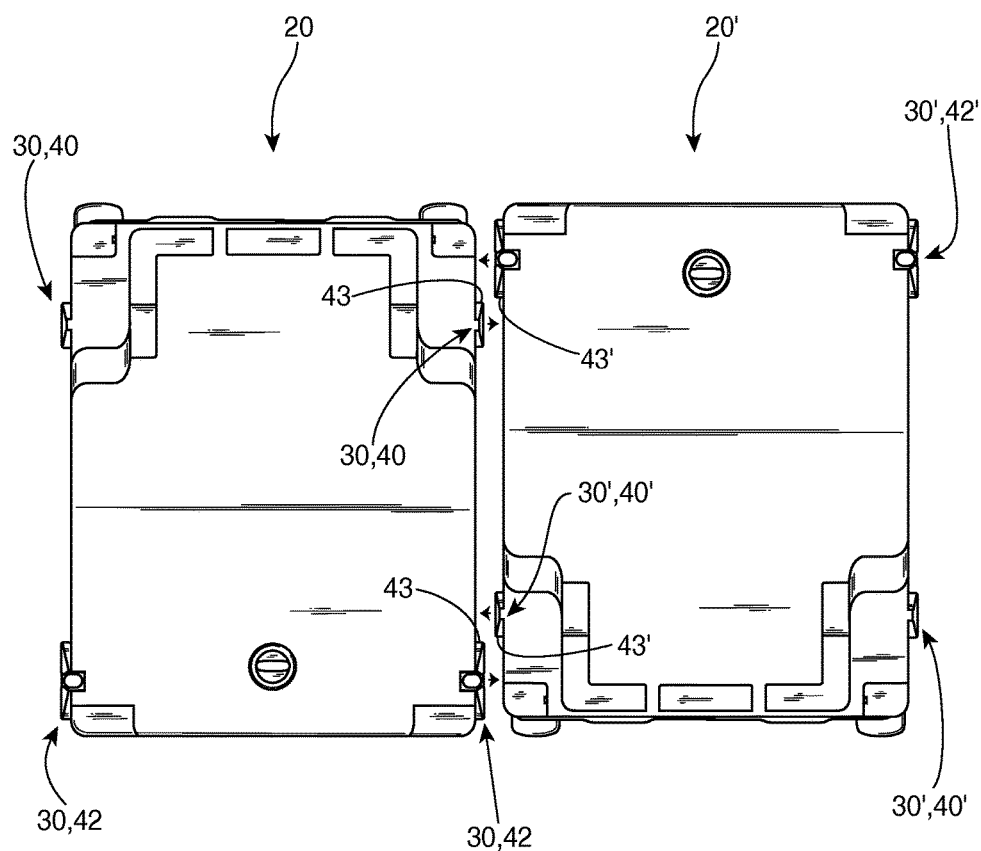
FIG. 10 is a top view of two containers disposed in an adjacent, side-by-side, lateral relation to one another, as disclosed in accordance with at least one embodiment of the present invention.

For example, referring to FIGS. 1 through 10, at least one embodiment of the present invention includes one or more interlocking, mating or engaging portions 30 defined as at least one external protrusion or mating portion 40, 42 that is configured and disposed to mate or engage with similar external protrusion(s) or mating portions 40', 42' of an adjacent or adjoining container 20' (FIG. 10). Particularly, external protrusion(s) or mating portions 40, 42 of at least one embodiment are positive, outwardly extending members, such as ledges or other like structures that cooperatively engage with other cooperatively structured and corresponding portions of the adjacent or adjoining container 20'. In the embodiment shown, the external protrusions or mating portions 40, 42 are disposed on opposite lateral sides of the container 20, for example, on or near the side walls 23, 24 or a corresponding lip or edge 28. Particularly, each side of the container 20 in the embodiment illustrated includes two external protrusions or mating portions 40, 42—one near the front (e.g., proximate the juncture between the side walls 23, 24 and the front wall 25) and one near the rear (e.g., proximate the juncture between the side walls 23, 24 and the rear wall 26). However, it should be noted that other embodiments may include more or fewer external protrusions or mating potions 40, 42 disposed in different locations about the exterior of the container 20, including along the side walls 23, 24, end walls 25, 26, lip 28 or other portion(s) of the container 20.

Referring to FIG. 10, the external protrusions or mating portions 40, 42, for example, on one side of the container 20, are cooperatively positioned such that when an adjacently disposed or adjoining container 20' (such as laterally disposed or side-by-side container, as shown by arrows in FIG. 10) is disposed next to the container 20, the mating portions 40, 42 of one container 20 will substantially match up or align with and laterally engage the mating portions 40', 42' of the adjacent container 20'. For example, on the same side of container 20, one mating portion 42 may be offset from the corresponding or closest corner of the container 20 a different distance than a second mating portion 40 is offset from its corresponding or closest corner of the container 20. The offset distances are determined such that when an adjacent or adjoining container 20' of a similar construction is rotated (e.g., 180 degrees) and adjacently aligned (as shown in FIG. 10), the mating portion 42 of container 20 will laterally mate or engage with the corresponding positioned mating portion 40' of adjacent or adjoining container 20', and the mating portion 40 of the container 20 will mate or engage with the correspondingly positioned mating portion 42' of the adjacent or adjoining container 20'.

Particularly, because the mating portions 40, 42 extend at least partially outward from the container 20, the mating portions 40, 42 each include at least one lateral edge or surface 43 that extends from the container 20. The lateral surfaces 43 and 43' will mate or engage with one another thereby preventing or at least partially restricting movement between the container 20 and laterally disposed adjacent or adjoining container 20' in at least one direction, such as, in a front to back linear direction. Rotational movement between the containers 20, 20' is also restricted by the mating or engaging side-to-side relation there between.

It should be noted that the side walls 23, 24 and/or the front and rear walls 25, 26 (or a corresponding ledge or lip thereof) of one or more embodiments of the present invention may include offset abutting members or ledges or cooperative positive and negative interlocking members. Other interlocking or abutting members structured to restrict lateral, rotational or other movement of adjacently disposed or engaged containers are contemplated and within the full spirit and scope of the present invention.

Figure 2:
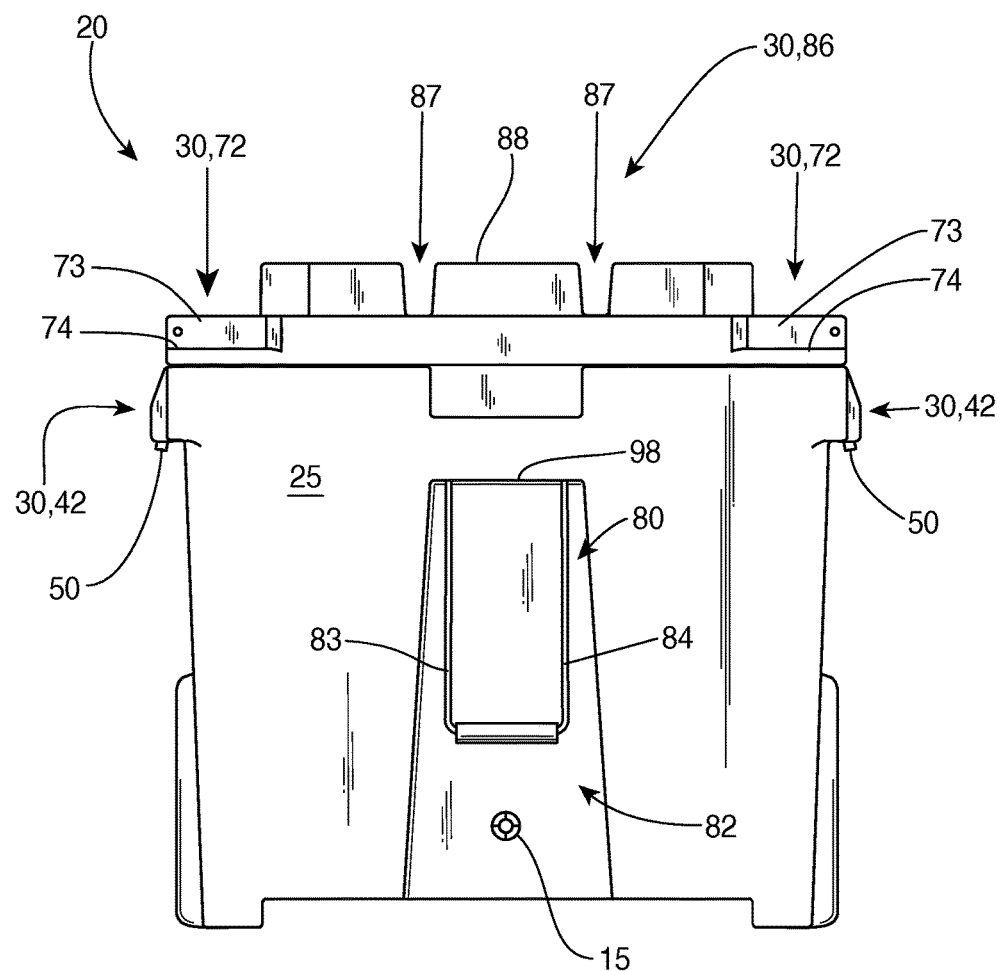
FIG. 2 is a front view of the container illustrated in FIG. 1.

Referring back to FIGS. 1 and 2, in at least one embodiment, the present invention includes a lid securing or closure assembly 50 extending between the lid 2 and the base 1 of the container 20 in order to at least partially secure the lid 2 in a closed orientation. For example, the lid securing or closure assembly 50 of at least one embodiment may include a pivoting or other movable structure fixedly secured to the lid 2 and removably securable to the base 1, as shown in FIGS. 1 and 2. For example, in one embodiment, the lid securing or closure assembly 50 may include a rubber (or other) T-handle or T-bracket, as shown, that pivots into and out of a securing relation between the lid 2 and the base 1. However, it should be noted that the reverse may be contemplated, meaning that the pivoting or other movable structure of the lid securing assembly 50 may be fixedly secured to the base 1 and removably securable to the lid 2.

Still referring to FIGS. 1 and 2, the lid securing or closure assembly 50 of at least one embodiment may be substantially or completely recessed when disposed in the secured relation (as shown), or otherwise, when the lid 2 is securely held to the base 1 via the lid securing or closure assembly 50. Accordingly, as mentioned above, in one embodiment, the lid closure assembly 50, which may be in the form of a "T-bracket" or other lock, may be at least partially recessed within the base 1, and in particular, within at least one of the external protrusions or mating portions 42. In this manner, when the lid 2 is closed onto the base 1, a user may pivot or maneuver the T-bracket or other lid securing assembly 50 downward and into an engaging and at least partially recessed relation into a correspondingly positioned external protrusion or mating portion 42. Thus, the external protrusion or mating portion 42 of at least one embodiment, may include a recessed channel cooperatively structured and dimensioned to removably receive and engage the lid closure assembly 50 therein.

Referring to FIGS. 1 through 9, at least one embodiment of the present invention further includes a wheel assembly, generally referenced as 60, comprising at least one, but more practically, a plurality of at least two wheels 62, such as, for example, enlarged or heavy duty wheels. In particular, each of the wheels 62 may, but need not necessarily be at least partially disposed within a corresponding wheel well 64 or wheel retention portion positioned at or near the side and/or rear walls of the base 1, or otherwise in the rear bottom portions of the container 20 or base 1. Particularly, in at least one embodiment, the wheels 62 are substantially constructed of rubber having a ten inch diameter, and include a bearing to facilitate rotation thereof, however, it should be apparent that other materials and sizes are contemplated within the full spirit and scope of the present invention.

In addition, the wheels 62 of at least one embodiment may be connected to one another via a single axle extending between the wheels 62 and along a substantial portion of the width of the base 1. Additionally, the axle of at least one embodiment may reside or nest within an indent on the outside of the container 20 or base 1 which extends along a substantial portion of the width and up into the wheel wells 64. The nesting of the axle within the retention indent (not shown) is structured to restrict or prevent the axle form twisting or rotating. In this manner, the wheels 62 may rotate via a bearing attached to the axle and/or wheels 62. In at least one exemplary embodiment, the axle may include a metal or other rigid tube measuring approximately 0.79 inches in diameter and 24.8 inches long although other dimensions, materials and configurations structured to facilitate implementation of the present invention in the intended manner is contemplated.

In at least one embodiment, the outermost portion of the wheels 62 may be flush with, recessed from, or only slightly extending beyond the outer surface of the side walls 23, 24 and rear wall 26. This allows the containers 20 and adjacent or adjoining side-by-side and end-to-end containers 20' to engage, abut, mate or otherwise be disposed proximate one another without the restriction or substantial restriction from the wheels 62. It should be noted, however, that the wheels 62 of at least one embodiment may extend beyond the bottom surface of the container 20, for instance, in order to allow a user to move or transport the container 20 via the wheels 62 rotating on the surface, such as the ground.

Figure 3:
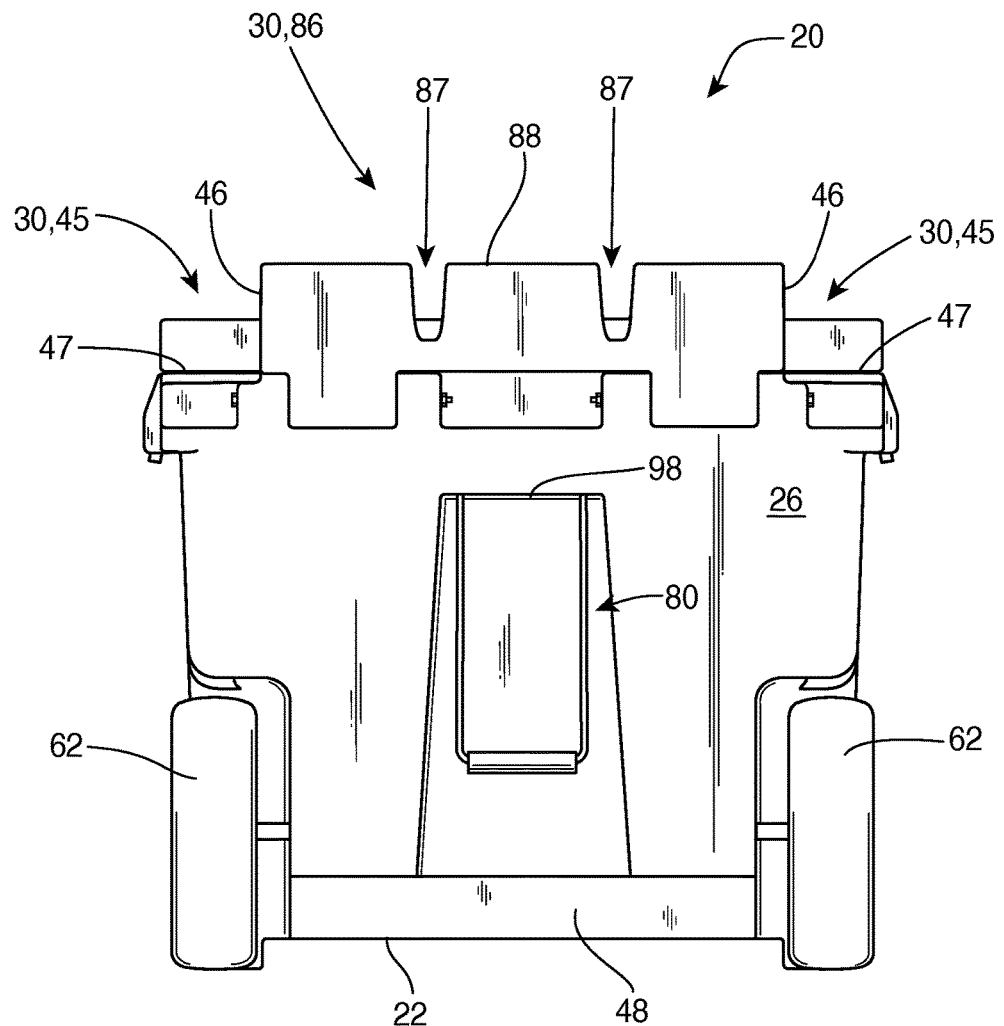
FIG. 3 is a rear view of the container illustrated in FIGS. 1 and 2.
Figure 4:
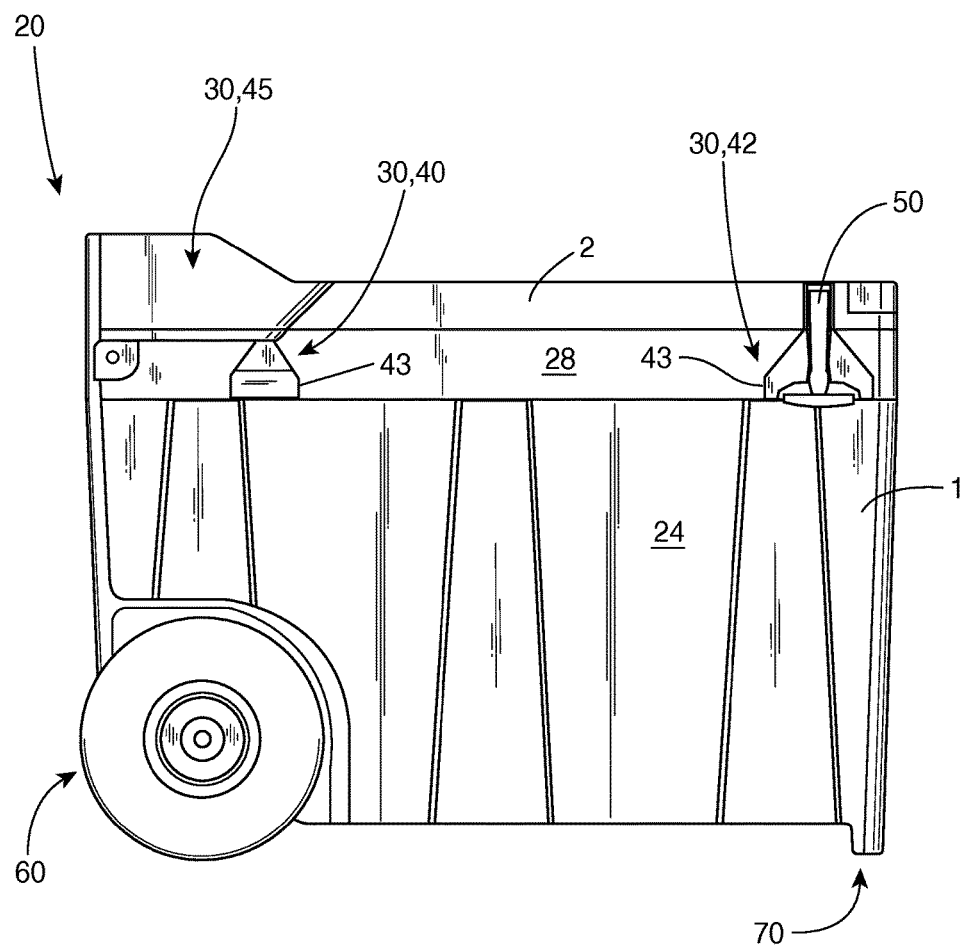
FIG. 4 is a left side view of the container illustrated in FIGS. 1 through 3.
Figure 5:
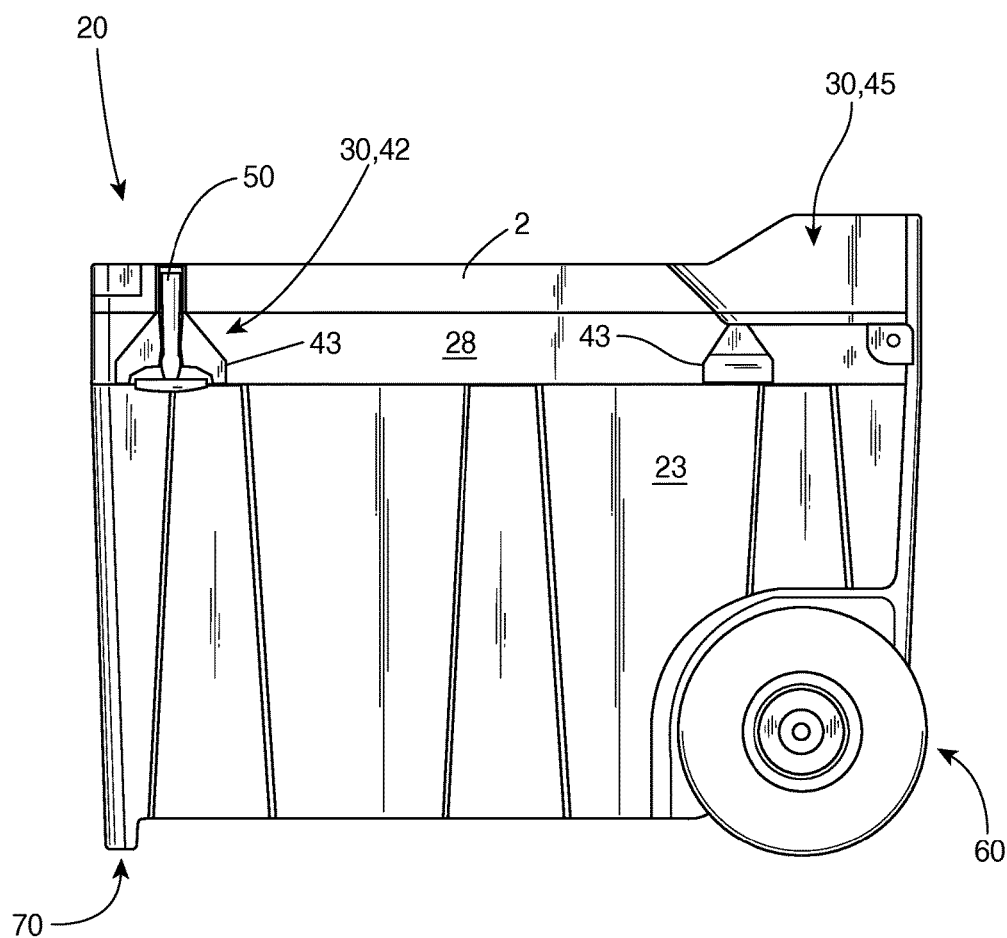
FIG. 5 is a right side view of the container illustrated in FIGS. 1 through 4.
Figure 6:
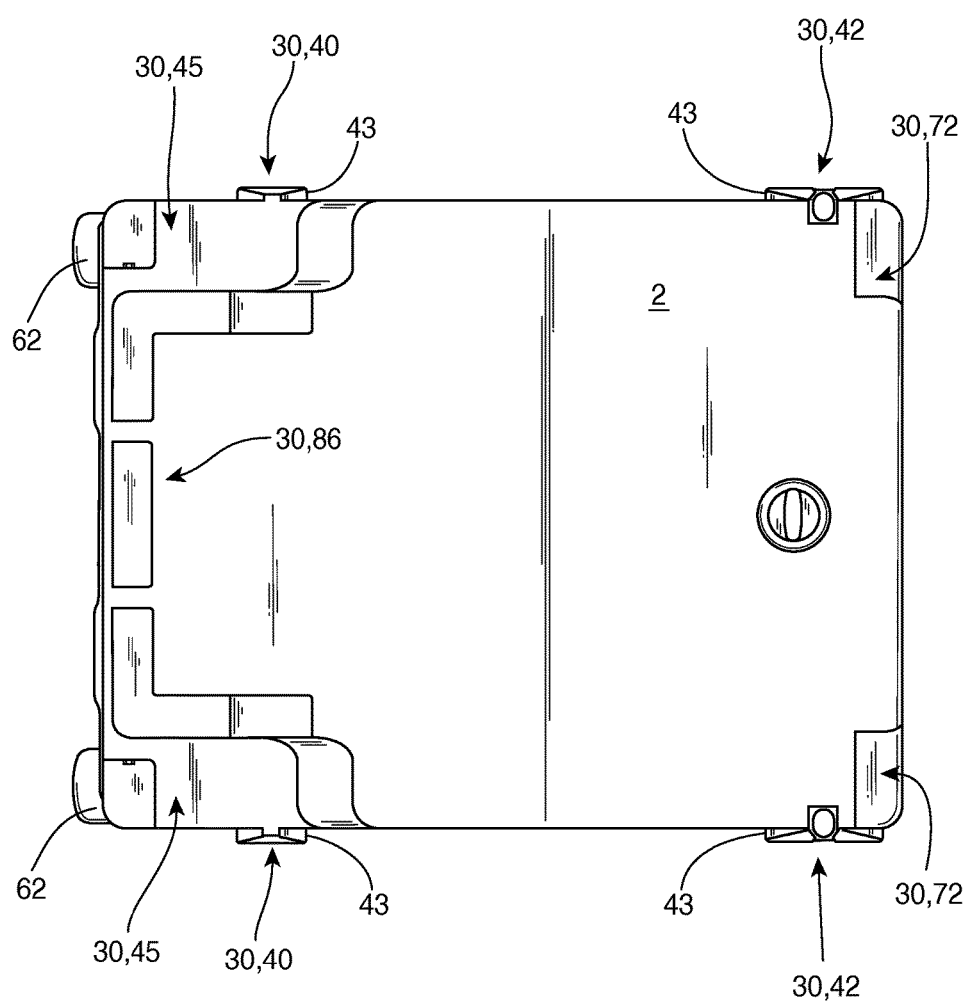
FIG. 6 is a top view of the container illustrated in FIGS. 1 through 5.
Figure 11:
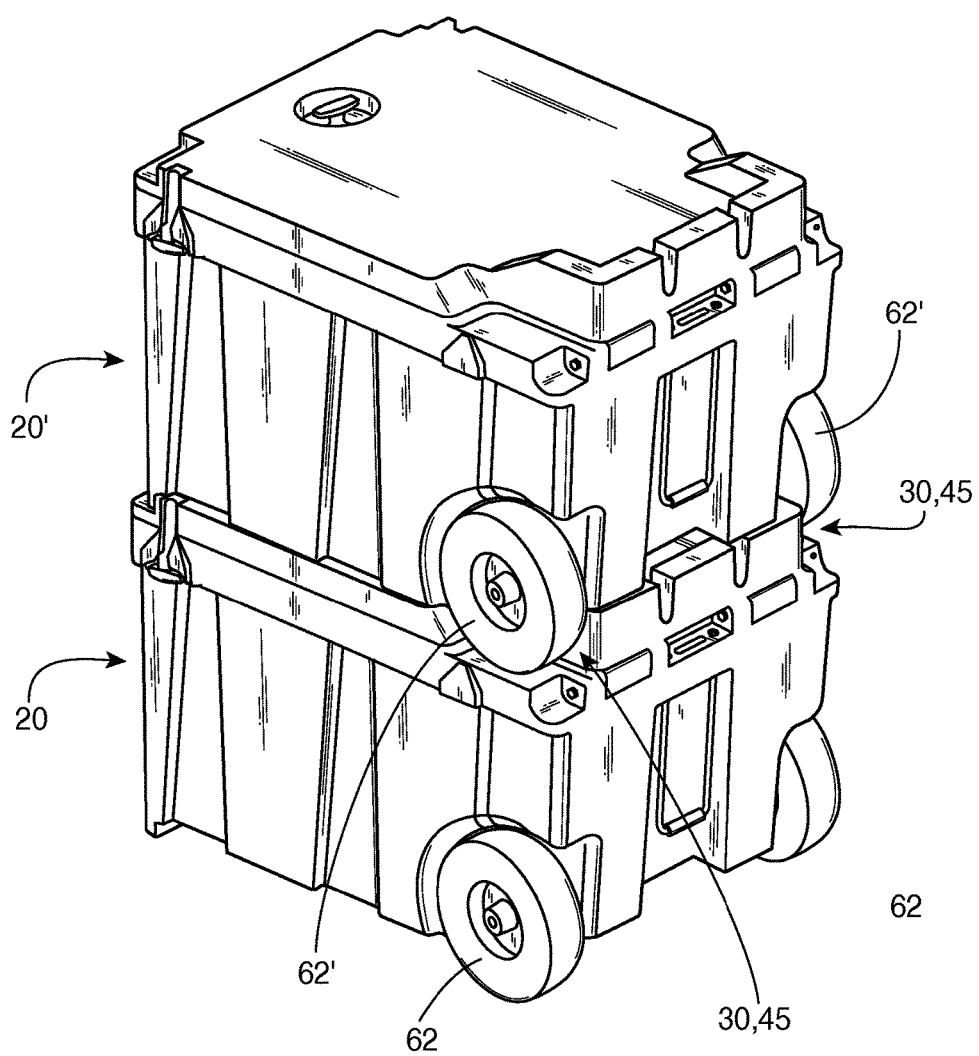
FIG. 11 is a rear perspective view of two containers disposed in an adjacent, stacked relation to one another, as disclosed in accordance with at least one embodiment of the present invention.
Figure 12:
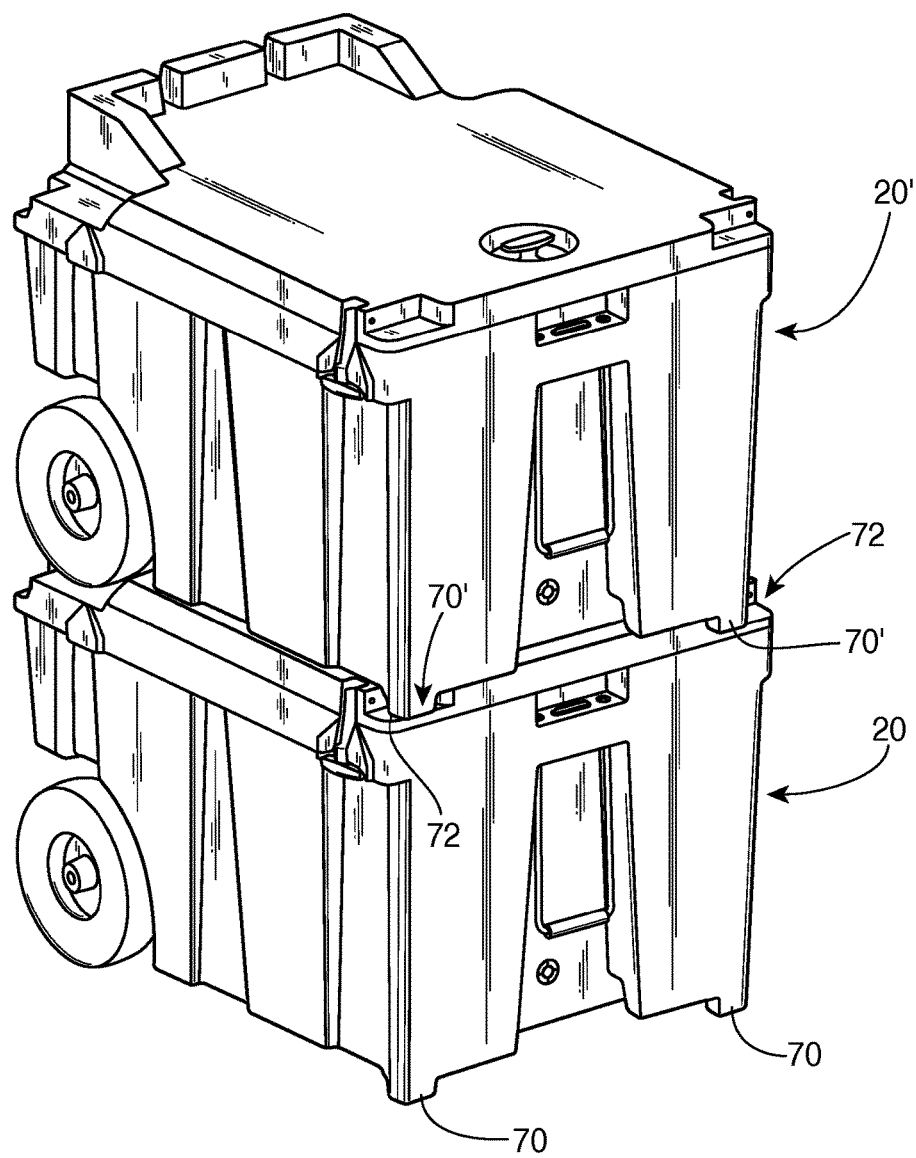
FIG. 12 is a front perspective view of two containers disposed in an adjacent, stacked relation to one another, as disclosed in accordance with at least one embodiment of the present invention.

Furthermore, the plurality of interlocking, engaging or movement restriction portions 30 of the container 20 of at least one embodiment of the present invention may include a wheel assembly receiving portion 45 disposed on an upper portion of the container 20 and being configured to at least partially receive and/or retain a portion of a wheel assembly from an adjacent or adjoining stacked container 20'. In particular, as shown in the exemplary view of FIG. 11, the wheels 62' of one container 20' (e.g., a stacked container) will at least partially fit within the wheel assembly receiving portion 45 of a lower container 20 upon which it is stacked. For example, as shown in FIGS. 1 and 3, the lid 2 of at least one embodiment may be shaped, configured or at least partially constructed to define at least two spaced apart recesses, for instance, at a rear portion thereof. Those recesses may be cooperatively configured to allow the wheels 62 of another, stacked container 20' to pass into the wheel assembly receiving portion 45. Particularly, upon stacking a container 20', the wheels 62 of the stacked container 20' may be positioned into the wheel receiving portion 45. In this manner, as shown in FIG. 11, for example, the containers 20, 20' may be stacked upon one another while the wheels 62 fit within the wheel assembly receiving portions 45. Upon doing so, the extending or protruding wall(s) 46 and floor 47 that define the recesses of the wheel assembly receiving portion 45 are structured to at least partially restrict movement of the stacked container 20 in at least one direction, including, for example, a side-to-side movement, twisting or rotating movement, etc. relative to the lower container 20.

In addition, referring to FIGS. 3 and 9, the container 20 comprises an elongated bottom surface member, generally referenced as 48, disposed between the two wheels 62. Although, this elongated bottom surface member 48 is shown as a generally flat surface angled with respect to the bottom wall 22 and rear wall 26 of the container, virtually any type of surface may be contemplated. Either way, as shown in FIG. 1, the lid 2 of at least one embodiment comprises at least one cooperatively structured surface 49 that is configured to at least partially mate with the elongated (or other) bottom surface of a stacked container 20'. Again, in the embodiment shown, the elongated bottom surface member 48 of one container and the cooperative surface member 49 of the lid 2 of another container comprise cooperatively angled, yet substantially flat surfaces that mate with one another. Although other surfaces, whether angled, flat, smooth, bumpy, with ridges and recesses, etc. are contemplated.

Further structural features of at least one embodiment of the present invention include at least one support foot 70 disposed at or near the bottom of the base 1, for example, in the front thereof as shown in the exemplary embodiment of FIGS. 1 through 9. Specifically, the foot 70 may contact a support surface, such as the ground, pallet or an adjacent or adjoining lower container, and maintain the container 20 in a substantially level or stable orientation. This may be particularly useful when loading or unloading the container 20, for example, with equipment, materials or other items, or in order to support the bottom container(s) 20 in a stacked relation, as described herein.

In particular, certain embodiments may include a plurality of feet 70 disposed in a spaced relation along the bottom of the container, whereas other embodiments may include a single foot 70 such as, but not limited to an elongated foot.

In any event, the plurality of interlocking, engaging or movement restriction portions 30 of the container 20 of at least one embodiment of the present invention may include at least one foot receiving portion 72 disposed on an upper portion of the container 20 and being configured to at least partially receive and/or retain at least a portion of a foot 70 from an adjacent or adjoining and stacked container 20'. In particular, as shown in the exemplary view of FIG. 11, the feet 70' of one container 20' (e.g., a stacked container) will at least partially fit within the a corresponding foot receiving portion 72 of a lower container 20 upon which it is stacked.

For example, as shown in FIGS. 1 and 2, the lid 2 of at least one embodiment may be shaped, configured or at least partially constructed to define one or more recesses, for instance, at a front portion thereof or otherwise in a location which corresponds to the location of feet 70 of a stacked container. The recess may be cooperatively configured to allow the foot or feet 70 of another, stacked container 20' to pass into a corresponding foot receiving portion 72. Particularly, upon stacking a container 20', the foot or feet 70 of the stacked container 20' may be positioned into the foot receiving portion(s) 72. Upon doing so, in at least one embodiment, extending wall(s) or surface(s), 73,74 that define the recesses of the foot receiving portion(s) 72 are structured to at least partially restrict movement of the stacked container 20' in at least one direction, including, for example, a side-to-side movement, twisting or rotating movement, etc. relative to the lower container 20.

In other embodiments, for example, the front edge of the lid 2 or container 20 may be chamfered (not shown) such that when a container 20' is stacked thereon, the foot or feet 70 thereof may be positioned at least partially onto, into, or along the chamfered portion. For instance, the interior edge of the support foot 70 may comprise an angled configuration cooperatively configured with the chamfered edge of the lid 2 allowing the containers 20 to be easily stacked.

Further embodiments of the present invention include at least one handle assembly 80 that can be used, in some cases, to carry or transport the container 20, and in other cases, to interlock, engage or mate with an adjacent or adjoining container 20', as will be described. Particularly, the handle assembly 80 of at least one embodiment may include a flexible or bendable handle disposed on at least one end, side or other location of the container, for example, in a recessed cavity 82. For example, in one embodiment, the handle assembly 80 may include a rope or other like substantially flexible and durable material that can be easily grabbed and manipulated in order to carry, pull, lift, or otherwise move the container 20. In some embodiments, the container may include at least two handle assemblies 80, for example, disposed on opposite ends or opposite sides of the container 20, allowing a user to grab both handles 80, or allowing one user to grab one handle 80 and another user to grab the other handle 80, for transportation of the container 20. It should be noted that one or more handle assemblies 80 may be included or incorporated into other locations or portions of the container 20, including the lid 2, for example.

For instance, referring to the exemplary embodiment of the FIG. 1, the handle assembly 80 may include a rope handle, forming a loop or partial loop. In such a manner, the handle assembly 80 may include two sides 83, 84 that meet at a grip end 85, as shown. A rubber or other like grip may be secured at the grip end 85 of the handle assembly 80. Of course, other handle assemblies 80 may be contemplated within the full spirit and scope of the present invention, including, for example, a retractable handle, slidingly engaged handle, tubular handle, or handle assemblies made of rigid or semi-rigid materials, including, but in no way limited to plastic, metal or a combination thereof.

Figure 13:
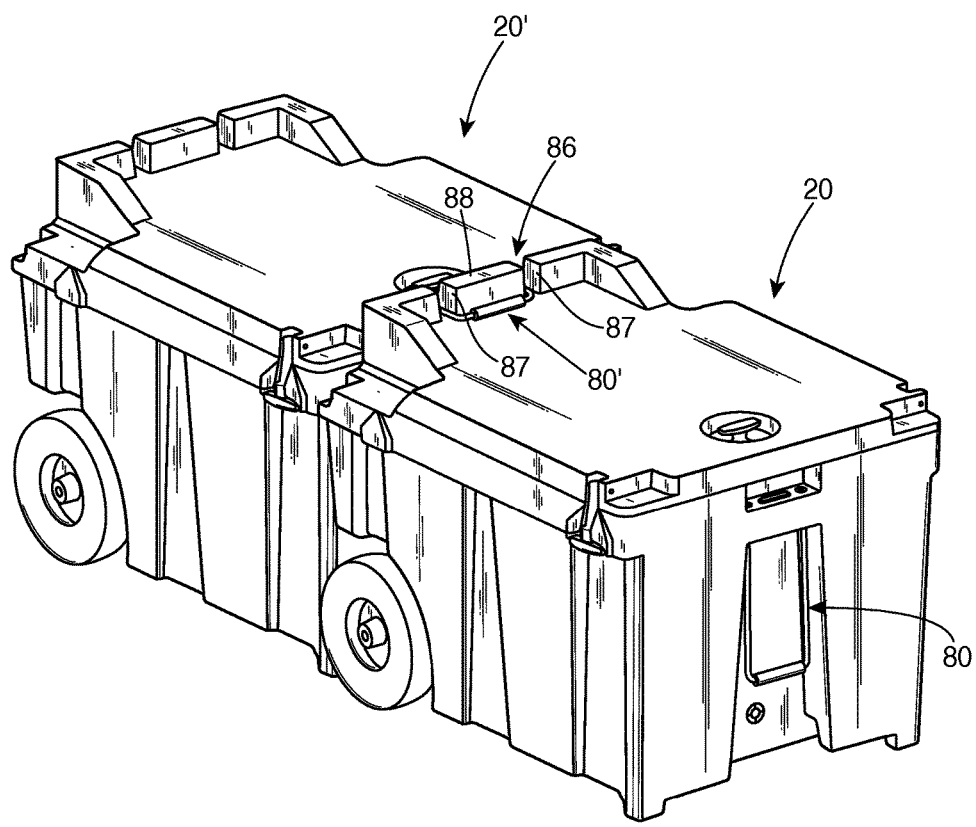
FIG. 13 is a perspective view of two containers disposed in an adjacent, end-to-end relation to one another, as disclosed in accordance with at least one embodiment of the present invention.

In addition, the plurality of interlocking, engaging or movement restriction portions 30 of the container 20 of at least one embodiment of the present invention may include a handle engagement portion 86 cooperatively structured to receive, retain and interlock with a handle assembly 80' from an adjacent or adjoining container 20', such as an end-to-end container 20', as shown in FIG. 13. Particularly, the handle engagement portion 86 of at least one embodiment is configured to retain the handle assembly 80, such as, but not limited to, a flexible and durable rope handle, in an interlocking and secure manner. As shown in FIG. 1, the handle engagement portion 86 of at least one embodiment is disposed on a rear, upper portion of the lid 2, although other locations on the container 20 may be contemplated.

Specifically, the handle engagement portion 86 of at least one embodiment includes at least one handle receiving region 87 disposed adjacent the end-to-end or other adjoining container 20'. The handle receiving region 87 may include an opening or aperture defined by one or more walls 88. In this manner, the handle assembly 80 may slide or fit within the opening of handle receiving region 87 and engage or interlock with the one or more walls 88, for example.

Particularly, referring to the embodiment illustrated, the at least partially looped handle assembly 80 may slidingly fit into the two handle receiving regions 87 by disposing the two sides 83, 84 of the handle assembly therein. The grip end 85 of the handle assembly 80 may thus engage wall 88 of the handle engagement portion 86, as shown in FIG. 13. This will at least partially restrict movement of the container 20 and/or the end-to-end adjoining container 20' in at least one direction, such as front to back direction.

Additional features of certain embodiments of the present invention may include a locking assembly and/or latch 90 structured to securely hold or lock the lid 2 in a tightly closed relation with the base 1. The locking assembly 90 may be mechanically fastened to the lid 2 via anchor bolts, rubber washers and nuts. For example, the locking assembly or latch 90 may include a cam operated latch embedded into the lid 2 and disposable into and out of an engaging relation with an internal lip disposed on the box or base 1. For instance a lever 92 (FIG. 1) may be manually rotated in order for a cam 94 (FIG. 14) to engage the inner lip, thereby securely locking or holding the lid 2 in place via compressive force against the gasket, for example, providing an air-tight and/or water-tight seal in certain embodiments. Unlocking or disengaging the cam 94 allows the lid 2 to pivot open, and in some instances the lid 2 may pivot 180 degrees to the open position. The locking assembly 90 may be equipped with a lock (e.g., keyed lock, combination lock, biometric lock, etc.)

Figure 14:
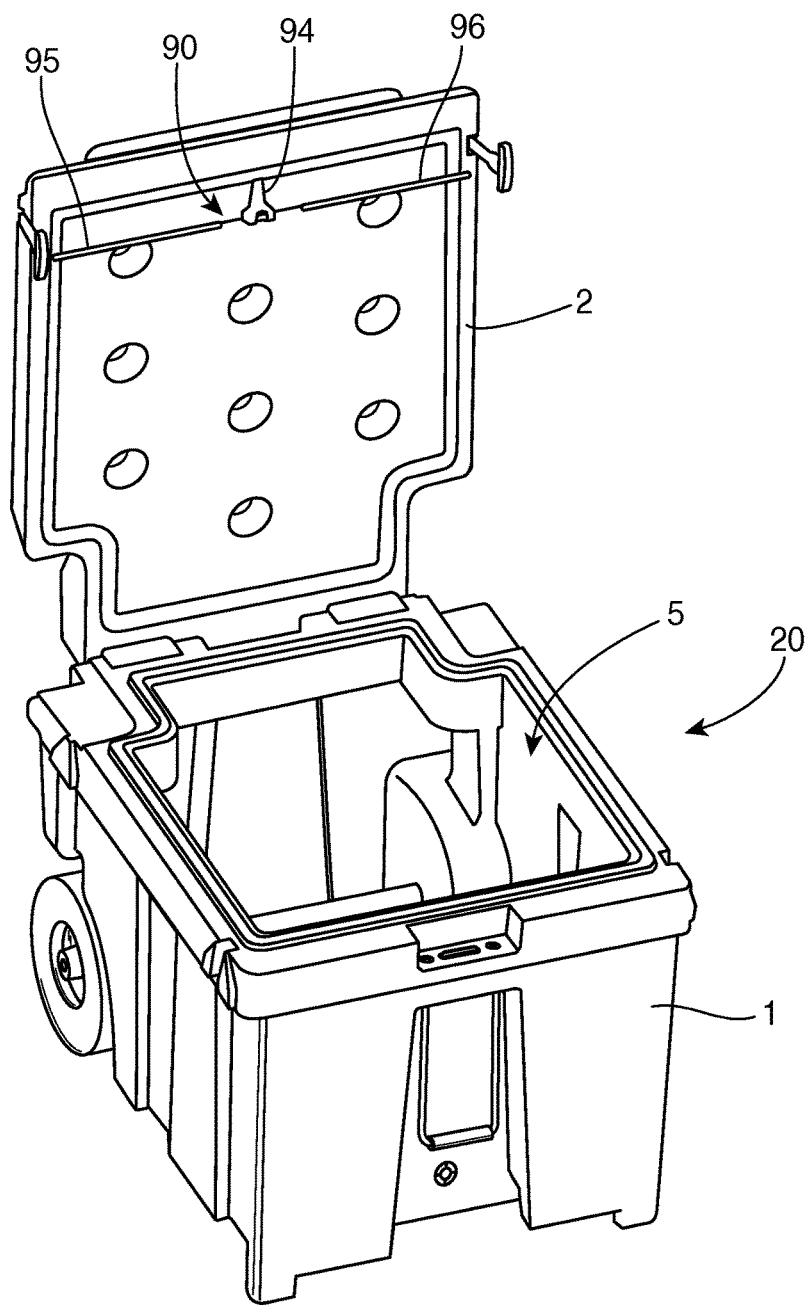
FIG. 14 is a top perspective view of a container as disclosed in accordance with at least one embodiment, with the lid open.

As shown in FIG. 14, the locking assembly 90 of at least one embodiment may include a multiple-point (e.g., a three-point) lock, meaning that there are multiple engaging portions on the inside of the locking assembly 90 that engage with an internal lip or recess on the base 1 or container 20. For example, in the embodiment illustrated in FIG. 14, in addition to the cam 94, the locking assembly 90 may include additional locking rods or members 95, 96 that engage or disengage with a cooperative lip or recess in order to lock and unlock the lid 2, respectively. For instance, manipulating the handle 92 of the locking assembly 90 to a locked position will simultaneously extend the cam 94 and the additional locking members 95, 96 into a locked engagement with a cooperative lip or recess. Similarly, moving the handle 92 to an unlocked position, will simultaneously disengage the cam 94 and the additional locking members 95, 96 from the cooperative lip or recess, thereby unlocking the lid 2. The multiple-point (or three-point) locking assembly 90 provides additional security and locking power to the container 20.

Referring again to FIG. 1, for example, the container(s) 20 of at least one embodiment may also include a pressure equalization valve or drain 15 disposed through the container 20, for example, in the base 1. The valve or drain 15 may be selectively opened and closed in order to equalize pressure or drain fluid from the container 20. For instance, the valve or drain 15 allows the container 20 to maintain a constant internal pressure relative to the air pressure outside of the container 20. For example, oftentimes the pressure inside the container 20 may be unequal to the pressure outside of the container 20, which can oftentimes create difficulty in opening the lid 2 and accessing the interior portion 5 of the container 20. Accordingly, a user may open the value in order to equalize the pressure inside of the container 20 relative to the outside pressure. In some embodiments, the pressure equalization valve 15 may be water proof or otherwise not pass water there through. However, in certain embodiments where the container 20 is used as a cooler or ice box, the drain 15 may be used to release excess water from the interior portion of the container 5. Thus, opening the drain 15 will create a pass through for fluid and other materials to drain or be released form the container 20. In a non-limiting exemplary embodiment, the valve or drain 15 may be made of Gore-Tex and plastic and measure approximately 0.57 inches wide and 0.23 inches from the face or surface of the container, although other materials, dimensions and configurations are contemplated.

Further embodiments may also include an additional retention slot or aperture 17 through which additional ropes, straps, cords, bungees, etc. may be secured or passed. As shown in FIG. 1, the retention slot 17 is disposed in an at least partially recessed portion on an end of the container 20 and can be included in a reinforced panel for additional strength and integrity. Accordingly, the slot 17 of at least one embodiment may pass completely through a portion of the container 20 allowing securing devices (e.g., ropes, straps, cords, etc.) to pass through the slot 17 and used for additional tie-downs, handles, or interlocking portions 30 of the present invention. For instance, using the additional retention slots 17, the container 20 may be tied or secured to an object, e.g., a car, truck, or pallet, or another adjacent container 20'.

Figure 7:
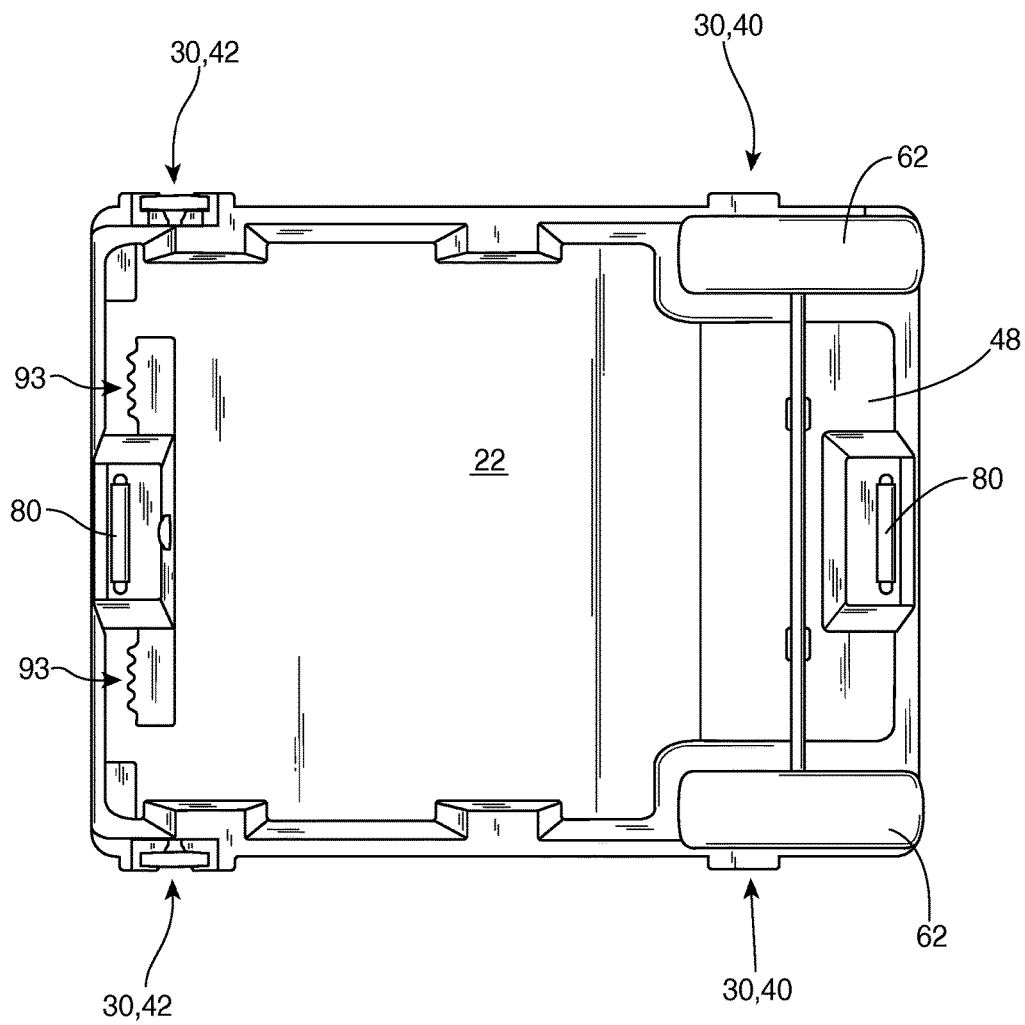
FIG. 7 is a bottom view of the container illustrated in FIGS. 1 through 6.
Figure 8:
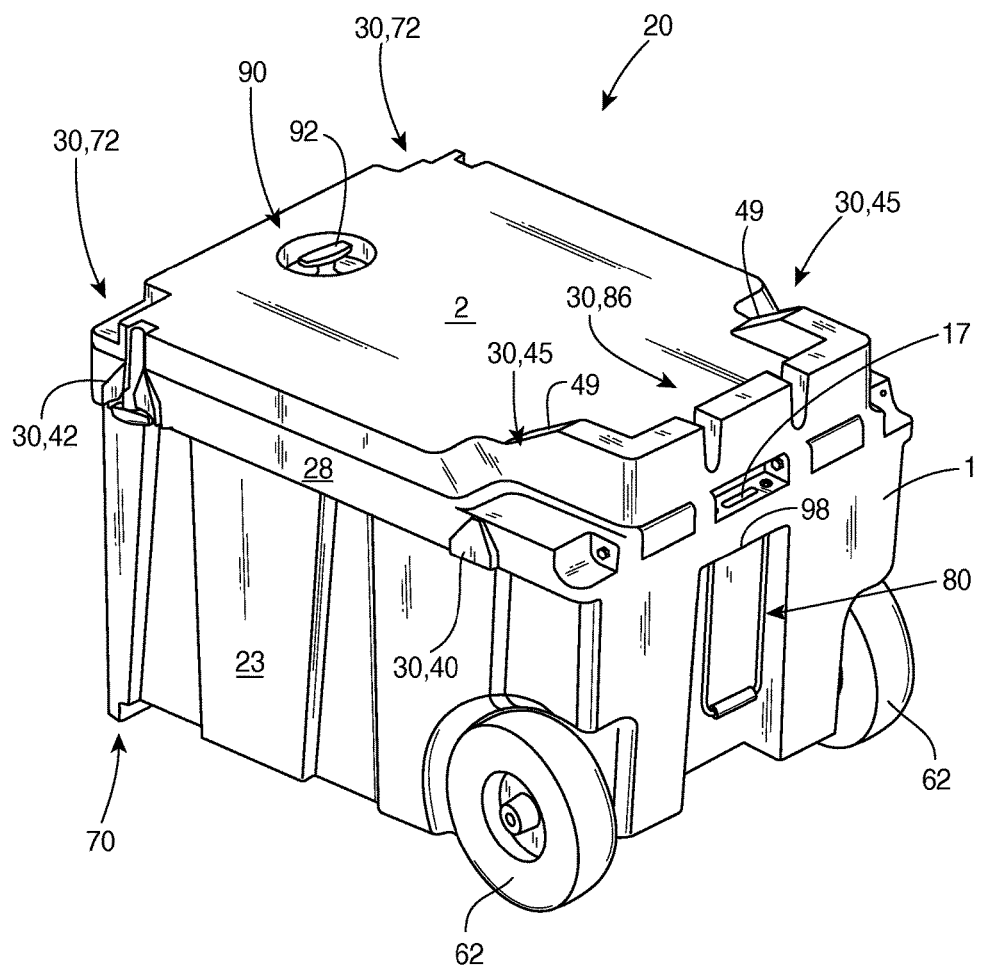
FIG. 8 is a rear perspective view of the container illustrated in FIGS. 1 through 7.

Additional structural features of certain embodiments of the present invention may include further handles 93, 98 embedded, molded or formed as part of the container 20 in order to further facilitate manipulation (e.g., movement, carrying, lifting, pulling or pushing) of the container 20. As an example, FIGS. 7 and 9 illustrate additional handle portions 93 formed on or near the bottom of the container 20. The handle portions 93 of the illustrated embodiment are defined by recesses in the base 1 of the container which can be grabbed or gripped by a user. A plurality of ridges, ripples or other like contours may be formed at one end of each of the resecess or handle portions 93 and can be used as finger holds or portions upon which a user's fingers may easily engage for faciliting the manipulation of the container.

Additional handle portions 98 are also illustrated in FIGS. 1, 2, 3, 8 and 9, which are formed by a ledge or overhang, for example, an at least partially downward overhang formed as part of the base 1 or container 20. In the illustrated embodiments, the additional handle portions 98 are shown as being located on the ends of the container 20 and as part of the recessed cavities 82 which contain the handle assemblies 80, discussed above. In this manner, a user may grab onto the overhang or ledge of the additional handle portion 98 for facilitating manipulation of the container 20, if desired.

Referring now to FIG. 15, the containers 20 may be positioned in a lateral side-by-side relation, front-to-back or end-to-end relation and stacked relation, for example, in order to maximize the space provided in a pallet, such as, but certainly not limited to a 463-L Pallet. For example, as shown in FIG. 15, containers 20 are illustrated as being disposed on a pallet 110, such as a 463-L pallet. In certain implementations, the containers 20 are thus sized and configured such that they can be juxtaposed, adjoined, nested or adjacently disposed (side-by-side, end-to-end, and stacked) in a manner such that they cooperatively fit (e.g., at least three wide, at least three deep, and at least four stacked) on the pallet. Upon positioning the containers 20 in a side-by-side, end-to-end or stacked relation to one another, the various interlocking, mating or engaging portions 30 of the present invention will interlock, mate or engage with corresponding portions of the adjacent or adjoining (side-by-side, end-to-end or stacked) container 20', as described herein. The interlocking, mating or engaging portions 30 of the various embodiments are structured to maintain the adjacently positioned or adjoining containers 20' in place, restricting movement between the containers 20, 20', and minimizing collapse, especially during transportation.

Moreover, in certain embodiments, the entire lid 2 or at least some portions of the lid 2 may be constructed of double-walled rotationally molded plastic to provide reinforcement or added strength to the lid 2 allowing the ability to stack heavy loads on top of the lid 2 without the potential of cracking or collapse.

Figure 16A:
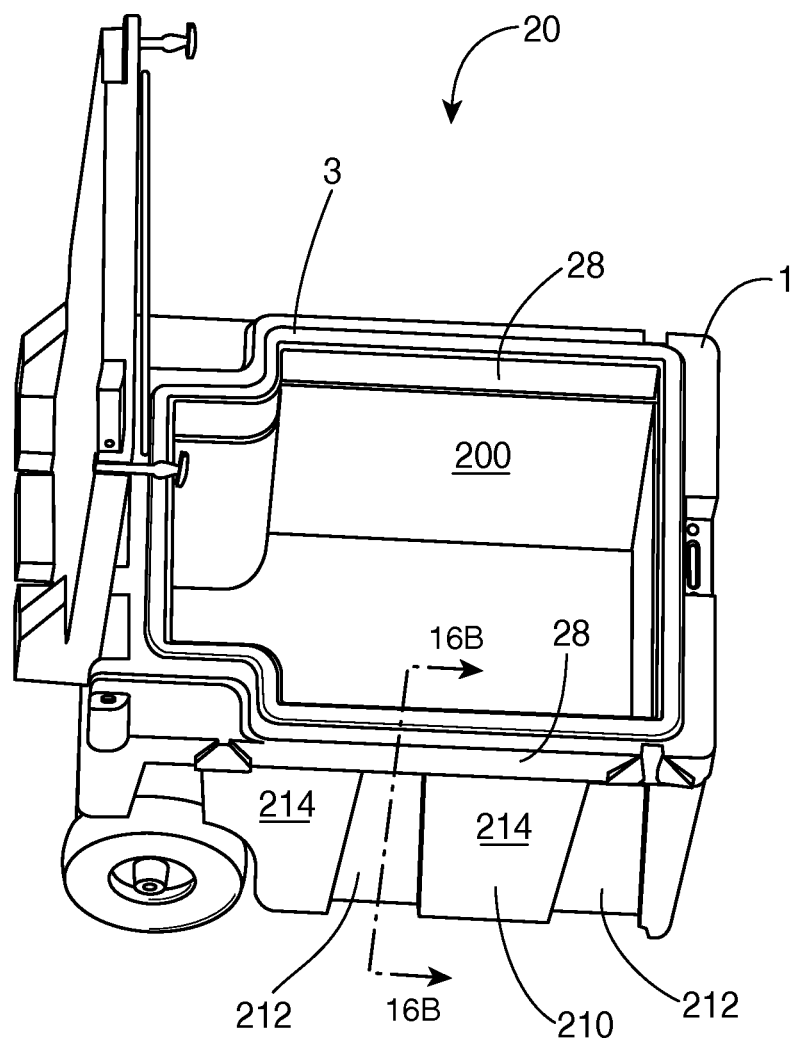
FIG. 16A is a top perspective view of a container comprising a double-walled construction, as disclosed in accordance with at least one embodiment of the present invention.
Figure 16B:
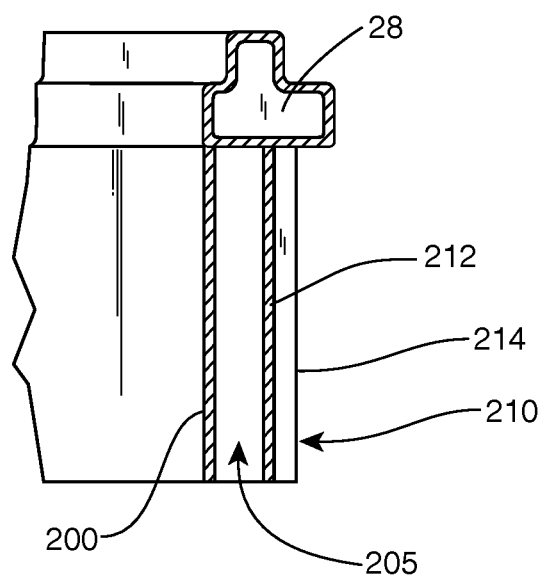
FIG. 16B is a cut-away view of the container with a double-walled construction along line 16B-16B, as illustrated in FIG. 16A.

Similarly, referring to FIGS. 16A and 16B, the box or base 1 of at least one embodiment may be double-walled, for example, with a double-walled lip 28. In addition, the side walls 23, 24 and end walls 25, 26 may also be double-walled or otherwise include an inner and outer wall. For example, FIGS. 16A and 16B illustrate the double-walled configuration of at least one embodiment of the present invention. It should be noted that the double-walled configuration may be constructed using rotational molding, although virtually any manufacturing technique may be implemented.

For example, the walls 23, 24, 25, 26 and in some embodiments the bottom 22 and lid 2, may include an inner wall 200 and an outer wall 210. As shown in FIG. 16B, the upper lip or edge 28 may also include a double-walled construction and may be disposed on top of both the inner wall 200 and the outer wall 210. Such a configuration (i.e., the double-walled lip and walls of the base 1) provides added integrity and stability to the container 20 and allows the container 20 to be able to withstand heavy loads stacked thereupon, such as, other adjacently stacked containers 20 which may be filled with heavy equipment or objects.

In addition, at least one of the walls, e.g., inner wall 200 or outer wall 210, may include a corrugated or honeycomb like configuration in that it may include alternating recesses 212 and protrusions 214, as illustrated via the outer wall 210 in FIG. 16A. The corrugated configuration also provides added integrity and strength to the container 20 such that the wall is able to support the lip or edge 28 in a more efficient manner.

Furthermore, as shown in FIG. 16B, in at least one embodiment, there may be a space 205 between the inner wall 200 and out wall 210. This space may be at least partially filled with foam or other insulating material, if desired, and particularly, in the embodiment wherein the container 20 may be used as a cooler or ice chest. Accordingly, not only does the double-walled configuration of at least one embodiment provide added strength and integrity, but it can also be used to provide insulation properties, which can facilitate maintaining a substantially constant temperature (whether hot or cold) on the interior thereof.

Figure 17A:
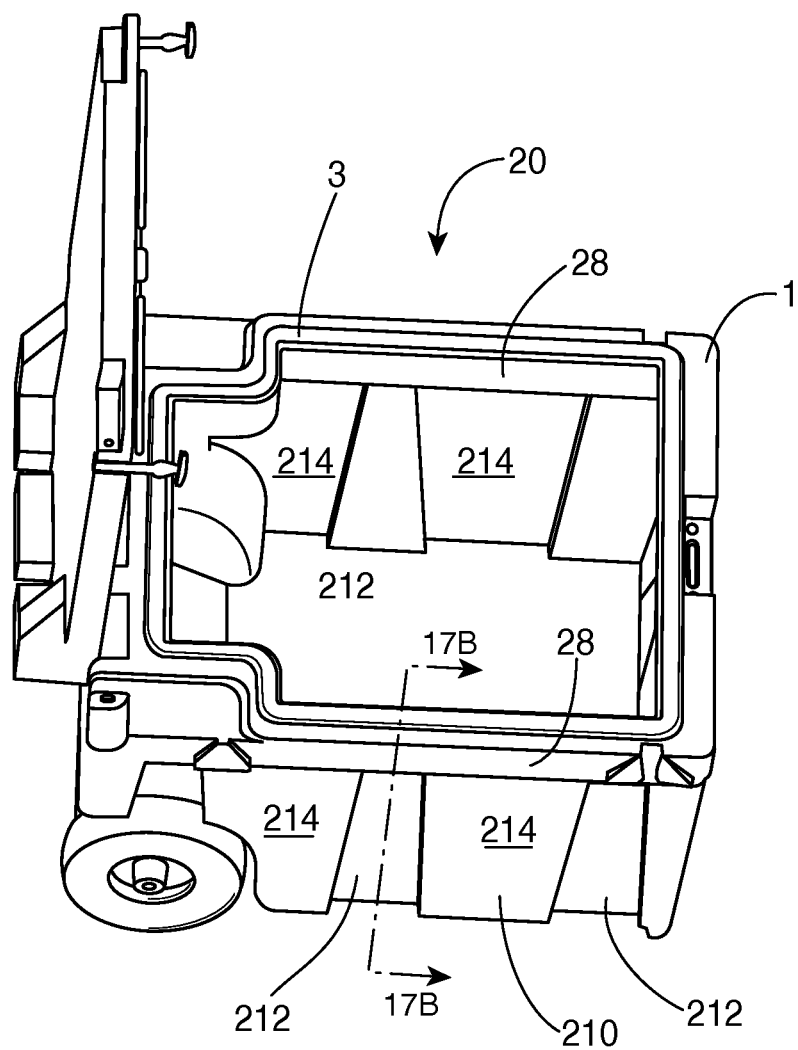
FIG. 17A is a top perspective view of a container comprising a single-walled construction, as disclosed in accordance with at least one embodiment of the present invention.
Figure 17B:
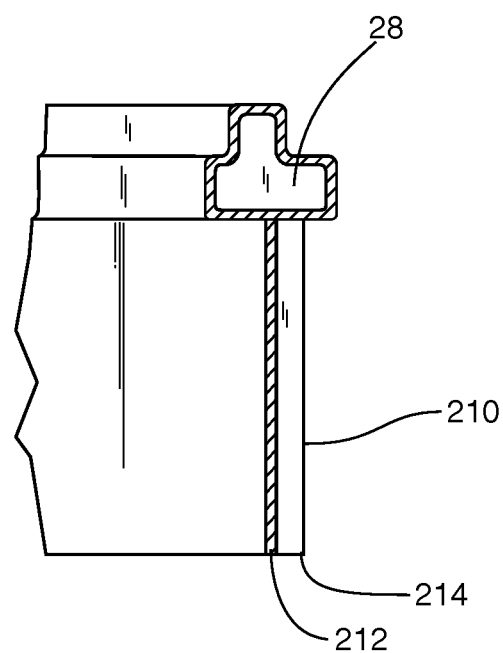
FIG. 17B is a cut-away view of the container with a single-walled construction along line 17B-17B, as illustrated in FIG. 17A.

It should be noted, however, that certain embodiments of the present invention may include a single-walled configuration at certain portions of the base 1. This can be used to maximize the interior dimension of the container and allow additional space for retaining items therein. For instance, the wall(s) 23, 24, 25, 26 of at least one embodiment may include a single-layered outer wall 210 which can be used to support the lip or edge 28. For instance, this may be accomplished by removing and discarding the inner wall 200 (e.g., by physically cutting the inner wall 200 out), although in some implementations the container 20 may be manufactured with a single-layered wall such that the inner wall need not be removed. Furthermore, in some embodiments, the lip or edge 28 may remain as a double-walled construction, as shown in FIG. 17B, for example, which, as above, can facilitate the strength and integrity of the container 20, especially when heavy loads (or stacked containers) are placed thereon. Accordingly, in some embodiments, and as described above, the outer wall portion 210 of the container 20 may include a corrugated, honeycomb or other uneven configuration comprising a plurality of recessed and protruding portions. This type of configuration can assist in the support of a double-walled lip in that the corrugated or other like wall 210 provides support to the lip or edge 28 in multiple areas via the recessed and extended portions of the corrugated configuration, rather than a straight line.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,
What is claimed is:

1. A container, comprising:
    an at least partially open-top base and a lid, said base comprising a bottom portion, at least two oppositely disposed side walls, and at least two oppositely disposed end walls,
    said lid disposable in an at least partially covering and at least partially removable relation to said base,
    a wheel assembly comprising at least one pair of at least partially recessed wheels,
    a plurality of mating portions disposable in an at least partially connected relation with corresponding portions of at least one adjoining container, said container and said at least one adjoining container comprising similar configurations, wherein said mating portions of said container, when disposed in the at least partially connected relation with the corresponding portions of the at least one adjoining container, are structured to restrict movement between said container and the adjoining container in at least one direction,
    said plurality of mating portions comprising a wheel assembly receiving portion disposed on an upper portion of said container, said wheel assembly receiving portion being configured to at least partially retain a wheel assembly of a stacked container, and
    said plurality of mating portions further comprising a foot receiving portion disposed on said upper portion of said container, said foot receiving portion being configured to at least partially retain at least one foot of the stacked container.

2. The container as recited in claim 1 wherein said wheel assembly receiving portion comprises at least two spaced apart recesses at least partially defined by said lid, each of said spaced apart recesses being structured and configured to receive at least a portion of a wheel of the wheel assembly of the stacked container.

3. The container as recited in claim 2 wherein said container comprises an elongated bottom surface member disposed between said pair of at least partially recessed wheels, and said lid comprises a protruding surface member cooperatively structured to at least partially mate with an elongated surface member of the wheel assembly of the stacked container.

4. The container as recited in claim 1 wherein said plurality of mating portions further comprise at least one side extension portion cooperatively engagable with a corresponding side extension portion of a laterally disposed container.

5. The container as recited in claim 4 wherein said at least one side extension portion of said container and the corresponding side extension portion of the laterally disposed container comprise laterally mating outward protrusions.

6. The container as recited in claim 5 further comprising at least two side extension portions.

7. The container as recited in claim 6 wherein at least one of said at least two side extension portions comprise an inner receiving portion engagable by a lid closure assembly to at least partially engage said lid to said base.

8. The container as recited in claim 1 further comprising at least one handle disposed on at least one of said two oppositely disposed end walls of said container.

9. The container as recited in claim 8 wherein said plurality of mating portions comprise a handle engagement portion structured to at least partially interlock with a handle of an end-to-end disposed container.

10. The container as recited in claim 9 wherein said handle engagement portion comprises at least one handle receiving region disposed adjacent the end-to-end disposed container.

11. The container as recited in claim 10 wherein said handle engagement portion comprises at least two open handle receiving portions structured to slidingly receive and interlock with the handle of the end-to-end disposed container.

12. The container as recited in claim 11 wherein said handle engagement portion is disposed on a rear, upper portion of said lid.

13. The container as recited in claim 1 wherein said base comprises a reinforced double-walled lip disposed at least partially around an upper portion of said base.

14. The container as recited in claim 13 wherein said two oppositely disposed side walls of said base comprise an at least partially corrugated configuration for at least partially supporting said reinforced double-walled lip.

15. A container disposable in a mating engagement with a plurality of additional containers of a similar construction, the plurality of additional containers comprising a stacked container, at least one laterally disposed container, and at least one end-to-end container, said container comprising:
an at least partially open-top base and a lid, said base comprising a bottom portion, two oppositely disposed side walls, and two oppositely disposed end walls,
said lid disposable in an at least partially covering and at least partially removable relation to said base,
a wheel assembly comprising at least one pair of at least partially recessed wheels,
at least one foot extending at least partially downward from said base,
at least one handle assembly, and
a plurality of engaging portions matingly disposed with corresponding portions of the plurality of additional containers, wherein said engaging portions of said container, when matingly disposed with the corresponding portions of the plurality of additional containers, are structured to restrict movement between said container and the plurality of additional containers in at least one direction,
said plurality of engaging portions comprising:
a wheel assembly receiving portion disposed on an upper portion of said container, said wheel assembly receiving portion being configured to at least partially retain a wheel assembly of the stacked container,
a foot receiving portion disposed on said upper portion of said container, said foot receiving portion being configured to at least partially retain at least one foot of the stacked container,
at least one side protrusion extending from at least one side of said container, said side protrusion being disposable in a mating engagement with a corresponding side protrusion of the at least one laterally disposed container, and
at least one handle engagement portion disposable in an interlocking engagement with a handle of at least one of the plurality of additional containers.

16. The container as recited in claim 15 wherein said at least one handle engagement portion comprises at least one open handle receiving portion disposed on said lid and structured to slidingly receive the handle of the at least one of the plurality of additional containers.

17. A container configured to matingly engage in a lateral relation, end-to-end relation and a stacked relation with a plurality of adjacently disposed, similarly constructed containers, wherein said container and the plurality of adjacently disposed, similarly constructed containers are collectively sized and configured such that nine of said containers fit end-to-end and laterally within a standard 463-L pallet, said container comprising:
an at least partially open-top base and a lid, said base comprising a bottom portion, two oppositely disposed side walls, and two oppositely disposed end walls,
said lid disposable in an at least partially covering and at least partially removable relation to said base,
a plurality of engaging portions matingly disposed with corresponding portions of the plurality of adjacently disposed, similarly constructed containers, wherein said engaging portions of said container, when matingly disposed with the corresponding portions of the plurality of adjacent containers, are structured to restrict movement between said container and the plurality of adjacent containers in at least one direction, and
wherein said plurality of engaging portions comprise at least one handle engagement portion disposable in an interlocking engagement with a handle of an end-to-end one of the plurality of adjacently disposed, similarly constructed containers.

18. The container as recited in claim 17 wherein said at least one handle engagement portion comprises two partially open handle receiving portions disposed on said lid of said container and structured to slidingly receive the handle of the end-to-end container.

19. The container as recited in claim 18 wherein said plurality of engaging portions further comprises a plurality of side protrusions each disposable in a mating engagement with a corresponding side protrusion of a laterally disposed one of the plurality of adjacently disposed, similarly constructed containers.

* * * * *